United States Patent [19]

Poerink

[11] Patent Number: 4,709,807

[45] Date of Patent: Dec. 1, 1987

[54] LINK CONVEYOR WITH INSERTED RODS

[76] Inventor: Nicolaas J. Poerink, Prins Bernardlan 25, NL-7620 AA Borne, Netherlands

[21] Appl. No.: 904,758

[22] Filed: Sep. 5, 1986

Related U.S. Application Data

[63] Continuation of Ser. No. 549,757, Nov. 8, 1983, abandoned.

[30] Foreign Application Priority Data

Nov. 11, 1982 [DE] Fed. Rep. of Germany ....... 3241632

[51] Int. Cl.$^4$ ............................................. B65G 17/06
[52] U.S. Cl. .................................... 198/853; 198/851; 474/223; 474/224; 411/509; 403/155
[58] Field of Search ..................... 198/851, 852, 853; 474/219, 223, 224; 403/154, 155; 411/508, 509, 510

[56] References Cited

U.S. PATENT DOCUMENTS

| 1,554,475 | 9/1925 | Wendell et al. ...................... 403/155 |
| 2,213,884 | 9/1940 | Ohmart ............................... 403/155 |
| 2,826,085 | 3/1958 | Cartlidge et al. .................... 474/224 |
| 2,852,129 | 9/1958 | Conner ............................... 198/853 |
| 2,911,091 | 11/1959 | Imse .................................. 198/853 |
| 3,036,695 | 5/1962 | Thuerman ........................... 198/853 |
| 3,269,526 | 8/1964 | Imse et al. .......................... 198/853 |
| 3,466,966 | 9/1969 | Brown ................................ 411/510 |
| 3,726,569 | 4/1973 | Maglio et al. ....................... 474/224 |
| 3,850,533 | 11/1974 | Thielen .............................. 403/154 |
| 4,069,911 | 1/1978 | Ray .................................... 198/627 |
| 4,076,430 | 2/1978 | Crook, Jr. ........................... 403/154 |
| 4,102,124 | 7/1978 | Swager ............................... 403/154 |
| 4,280,597 | 7/1981 | Schorwerth ........................ 403/155 |
| 4,438,838 | 3/1984 | Hodlewsky et al. ............... 198/853 |
| 4,615,343 | 10/1986 | Komossa ........................ 198/853 X |

FOREIGN PATENT DOCUMENTS

| 657010 | 2/1938 | Fed. Rep. of Germany ...... 403/155 |
| 710596 | 9/1941 | Fed. Rep. of Germany ...... 403/155 |
| 1556162 | 1/1970 | Fed. Rep. of Germany . |
| 2616723 | 10/1976 | Fed. Rep. of Germany . |
| 1063621 | 5/1954 | France ............................. 198/851 |
| 400492 | 6/1932 | United Kingdom ............... 403/155 |
| 778509 | 7/1957 | United Kingdom . |
| 1084946 | 9/1965 | United Kingdom . |
| 1330499 | 9/1973 | United Kingdom . |
| 1494439 | 12/1977 | United Kingdom . |
| 2041068 | 9/1980 | United Kingdom . |
| 1586549 | 3/1981 | United Kingdom . |

Primary Examiner—Frank E. Werner
Assistant Examiner—Jonathan D. Holmes
Attorney, Agent, or Firm—Cushman, Darby & Cushman

[57] ABSTRACT

A conveyor belt formed of links, in which the links each carry on a pair of opposite parallel sides, sleeve-shaped, mutually spaced ears which are each fitted into the spaces between the ears of adjoining links, such that the interfitted ears may be articulated relative to each other by transverse rods inserted therein. At the lateral side ears, the transverse rods are secured against displacement by pegs or dowels inserted from the side and acting as closing and stop devices.

1 Claim, 6 Drawing Figures

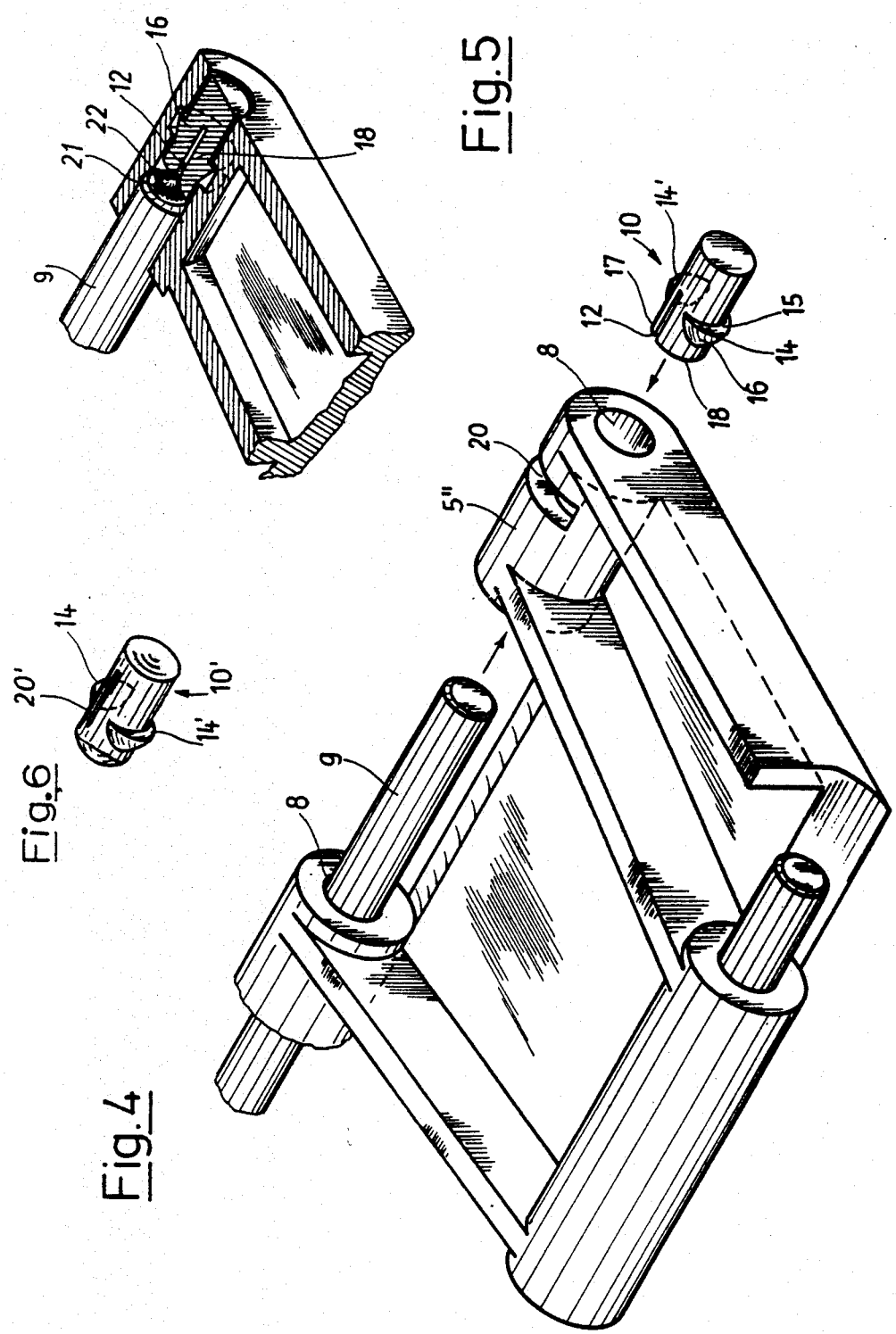

ND SUMMARY OF THE
LINK CONVEYOR WITH INSERTED RODS

This is a continuation of application Ser. No. 549,757, filed Nov. 8, 1983, which was abandoned upon the filing hereof.

BACKGROUND AND SUMMARY OF THE INVENTION

The present invention relates to a conveyor belt formed of plastic links, the links having a substantially rectangular outline and each carrying on two parallel sides thereof spaced sleeve-like ears provided with openings; The ears are each fitted into the spaces between the ears of adjoining links, with the openings of the links being aligned with each other and articulated to each other by means of inserted transverse rods which are locked in the axial direction thereof within the or lateral side ears.

Recently, applicant's company and other manufacturers have marketed link-type conveyor belts, especially plate-type or "flat top" conveyor belts in which the links are made of plastics material, for example polyamide, and in which the links are articulated together by means of inserted transverse rods or bolts. The supporting parts of the conveyor belt are termed the "links", thereby to indicate that they constitute plate-shaped or skeleton-type components which are each of a width to occupy a specific part of the conveyor belt width. In addition to a true rectangular shape, the links may be also of an approximately trapezoidal shape so as to be suitable for curved conveyor belts. Preferably, the ears are closed, sleeve-like structures. Alternatively, however, these parts, termed ears, may be formed with a jaw-like configuration, i.e. to be closed only partially, without departing from the principle of design.

U.S. Pat. No. 4,069,911 shows a known link-type conveyor belt in which the transverse rods interconnecting the links are secured in position by set screws threaded into a threaded hole at either end. In this structure, it is disadvantageous that the forming of threads in plastic injection molded parts requires a complicated injection mold subject to failure and trouble, which mold necessitates extended dead times and, thus, increased cost owing to the operations of unscrewing the threaded insert, which must be made at the time of mold release.

Further, the set screw used as a locking means may easily become loose as a result of continuous movement, such that the set screw, in turn, must be provided with safety locking means.

It is therefore the object of the present invention to facilitate insertion and locking of the transverse rods, while completely avoiding elements projecting beyond the lateral sides or above the conveyor surface. Likewise, threaded elements should be omitted, i.e. the design should orient itself particularly by the possibilities of the plastic material and provide for low-cost manufacture and repair.

These objects are solved in a link-type conveyor belt of the type outlined at the beginning, wherein the openings of the lateral side ears are closed by a peg or dowel inserted from the side with its full length to act as a locking element. The opening of each lateral side ear is provided with recesses extended in a direction transverse to the axis of the opening and defining vertical locking surfaces. The peg or dowel is provided on part of the length of its shank with a pair of resilient tongues each defining a wedge-shaped abutment as counterlocking surface, wherein the locking surfaces overlap each other with positive engagement in the locked position.

The element termed "peg" (or dowel) is inserted into the lateral opening with a tight fit, in which connection the means being known for peg or dowel techniques may be used for securing. The peg is inserted into the opening with its full length. The inner diameter of the opening is equal to that of the remainder of the ears. More particularly, the opening is wide enough to freely receive the transverse rod to be inserted.

The peg may be provided with one or more slits and/or recesses in at least part of its length. These provisions permit the peg to be compressed in its outer profile, so as to engage the opening with increased clamping force.

BRIEF DESCRIPTION OF THE ACCOMPANYING DRAWING

Further features of this invention will explained below with reference to the accompanying figures wherein:

FIG. 4 is an enlarged perspective view of the edge portion of a link-type conveyor belt;

FIG. 5 is a sectional view with a partially inserted holding peg or dowel; and

FIG. 6 shows a different embodiment of the holding peg or dowel.

DETAILED DESCRIPTION OF THE PREFERRED EXEMPLARY EMBODIMENTS

Figure 1:
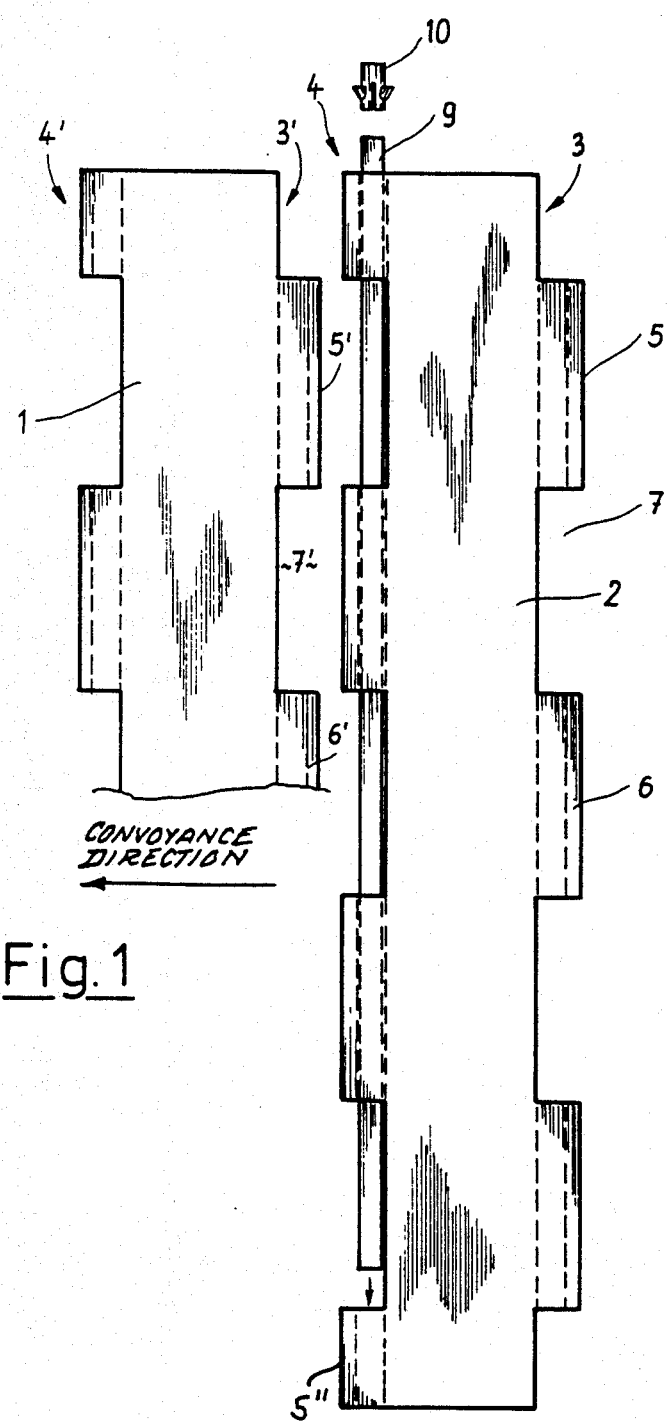
FIG. 1 is a plan view of a linked-type conveyor belt according to the invention, with the links separated from each other.
Figure 2:
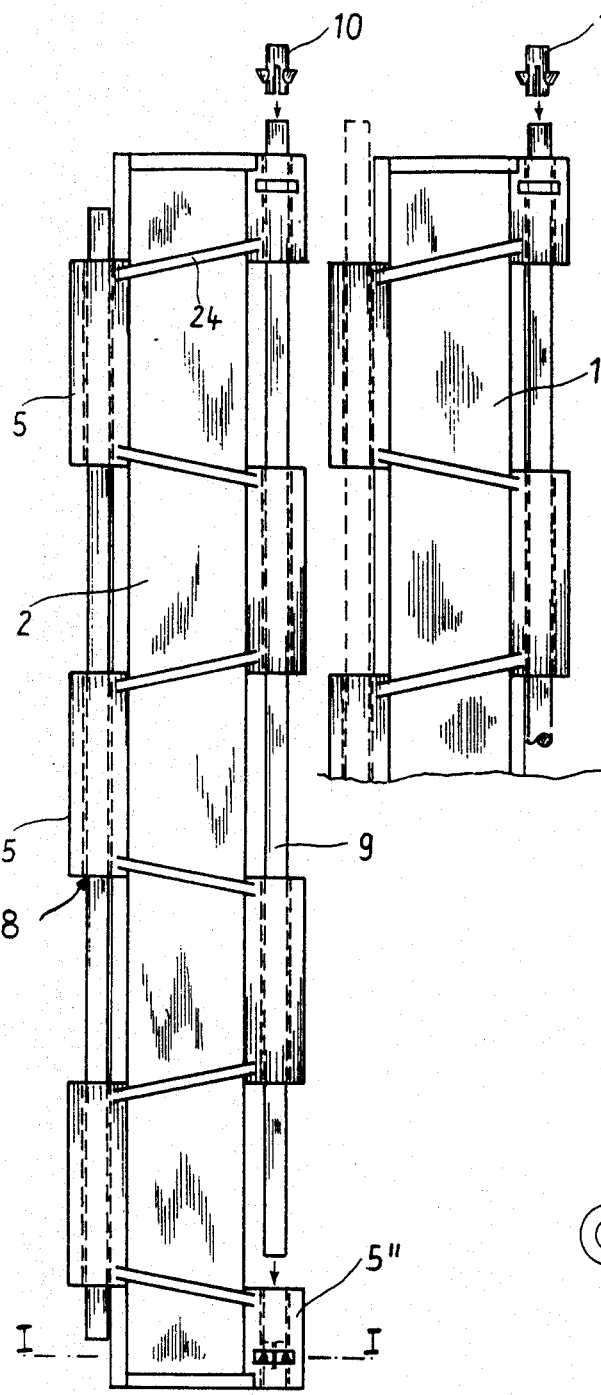
FIG. 2 is a bottom plan view of conveyor belt accordint to the invention.

As appears from FIGS. 1 and 2, an embodiment of the coveyor belt comprises plate-like links 1, 2 disposed in tandem in the direction of conveyance and each extending across the full width of the conveyor belt. The links 1,2 have each a substantially rectangular outline. On a pair of opposite parallel sides 3, 4, 3', 4' each, the links carry sleeve-shaped ears 5, 6, 5', 6' spaced from each other at a distance which permits fitting of the ears of adjacent links into the spaces 7 or 7', respectively. With the ears interfitted with each other, the openings 8 extending transversely of the direction of conveyance of the conveyor belt are aligned with each other. Transverse rods 9 are inserted through the aligned openings 8.

As far as described above, the structure of the conveyor belt is similar to that of conventional plate-type or link-type conveyor belts. Different from the embodiment according to FIGS. 1 and 2, the conveyor belt may be provided also with a plurality of links or plates in side-by-side relation transversely of the direction of conveyance. In the case that a curved conveying path is to be obtained, the plates or links should be given a configuration to be approximately trapezoidal in plan view.

As can be seen from FIGS. 1 and 2, the transverse rod 9 is shorter by a given amount than the transverse length of links 1, 2. Thus, when the transverse rod has been inserted, there is left on either side in the region of the edge links, i.e. of the belt link 2 in the present instance, a portion which is not occupied by the transverse rod. A peg or dowel 10, 10' is inserted from the side into this lateral portion, which peg or dowel acts as locking and stop device for the transverse rod 9. The peg or dowel is inserted into opening 8 with its full length.

Figure 3:
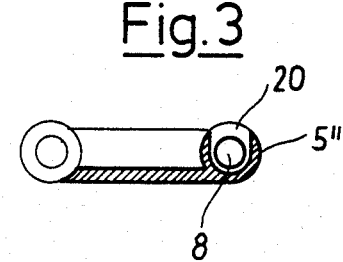
FIG. 3 is a sectional view along lines I—I in FIG. 2.

FIG. 3 is a sectional view along lines I—I. As can be seen, the end-side ear 5" is provided with a slot 20 providing for access to opening 8.

The peg or dowel, preferably formed of plastics material, such as polyamide or the like, has the shape of a cylinder of a length from about 3 to 8 mm, the cross-section (or profile) of which is suitably matched to the opening (compare FIG. 4). In its front end face to be inserted into the opening 8, the peg 10 is provided with a slit 12 extending parallel to the peg axis and starting in about the center part of the peg and being open at one end of the peg. Further, the peg has on the outer surface of its shank a pair of wedge-shaped abutments 14, 14' terminating in a stop or contact surface 15 perpendicular to the outer (peripheral) surface of the peg. The inclined ramp surface 16 producing the wedging effect defines an angle of between about 25° and 35° with respect to the outer (peripheral) surface. However, this angle depends also on the material used and the driving-in forces to be exerted. Accordingly, the diametral slit 12 defines at the end of the peg or dowel 10 a pair of resilient tongues 17, 18 which permit the peg to be compressed to some degree, and thereby, to be more easily inserted. In order to provide a definite abutment, the end-side ear 5" is provided with a slot 20 extending transversely to its peripheral surface and into the opening 8, with at.least one of the abutments 14 or 14' engaging into this slot 20 and thereby preventing the peg 10 from being urged out. As an alternative to this embodiment, however, it is also possible to provide interriorly of the opening 8, depressions or recesses into which one abutment engages. Conversely, it is also practicable to provide the peg or dowel with depressions or recesses to receive complementary protrusions at the inner surface of the opening 8. These measures are summarized under the collective term "locking elements".

Another advantage is that the pegs or dowels 10 may be given a color different from that of the remainder of the conveyor belt. With this measure, it is readily possible by optical means or even by a corresponding photoelectric monitoring device to detect the absence of pegs, which may be an indication of, for example, improper manufacture or wear.

Still further and as indicated in FIG. 5, it is also possible to provide the end of the transverse rod 9 with a tapered tip 21 extending into a complementary socket in the peg 10. When the transverse rod 9 is subjected to axial forces, this socket has the effect that the peg tongues 17, 18 are expanded, to thereby still better lock the peg against being urged out as compared to the embodiment according to FIG. 4. Experiments have shown that, upon urging or pressing out of the peg 10, the edge portion including the sleeve or ear 5' would sooner break off the plate-like link, than the peg would move out from its seat. It is ensured in this way that an excellent and secure mounting of the transverse rod is obtained under all forces to be expected in operation.

FIG. 6 illustrates a modified embodiment of the peg or dowel, indentified by numeral 10'. In this embodiment, the base sides of the peg are closed, while a diametral slit 20' permits the peg to be compressed in the vicinity of the abutments 14, 14'.

As shown in FIG. 2, the ears are interconnected on the underside by solid ribs 24. These ribs 24 extend substantially in the direction of conveyance and provide for high loadability in tension. Also, the surface of the link may be apertured at various points in case the plate or flat-top coveyor belt must have air blown therethrough. However, it should be emphasized again that the exterior configuration of the conveyor belt link may be of greatly different shapes; in particular, the inventive idea does not only embrace the illustrated plate-type coveyor belt links.

I claim:
1. A conveyor belt comprising:
a plurality of link members including plural spaced-apart sleeve-like ears each of which defines an opening, said ears of one said link member being interdigitated with said ears of an adjoining said link member such that said openings of said interdigitated link members are axially aligned with one another;
rod means inserted into said aligned openings of said one and adjoining link members for coupling said one and adjoining link members to one another to permit relative articulation between said one and adjoining link members about an axis established by said rod means, said rod means having opposing terminal ends each located within a respective opening of a lateral-most one of said ears to thereby define a space within said opening between said terminal end and an exterior side of said lateral-most one of said ears; and
plural locking means each inserted within a respective said defined space for axially locking said rod means within said aligned openings, each said locking means including a resiliently compressible peg having opposing base ends and a circumferential surface sized and configured to be accepted within said defined space, and a recessed surface radially extending from said defined space relative to said axis, wherein
said peg includes (a) means defining a locking surface resiliently compressible upon insertion into said defined space radially projecting from said circumferential surface of said peg relative to said axis for interlocking engagement with said recessed surface, the resiliency of said means defining said locking surface enabling the same to resume an uncompressed state when adjacent said recessed surface so as to provide said interlocking engagement, (b) means defining a wedge surface outwardly inclined from said circumferential surface and terminating at said locking surface for effecting wedged interengagement with said defined space, and (c) means defining an axial slit to establish a pair of resilient tongues, each said tongue including said locking surface and said wedge surface, said slit extending to a base end of said peg which is in confronting relation to a respective terminal end of said rod means, each said terminal end of said rod means defining a tapered surface, said base end of each said peg in confronting relationship to said respective terminal end defining a socket for accepting said tapered surface, said socket and terminal ends together establishing means for outwardly expanding said resilient tongues in response to axial displacement of said rod means toward said peg, wherein,
said means defining said locking surface and said wedge surfaces together lock said peg within said space, without permanently deforming the wall defining said space, which, in turn, axially locks said rod means within said aligned openings.

* * * * *